July 15, 1969   W. B. GILES   3,455,266
AIR FILM DRAG REDUCTION WITH VISCOELASTIC ADDITIVES
Filed Feb. 23, 1968   2 Sheets-Sheet 1

Inventor:
Walter B. Giles,
by Paul A. Frank
His Attorney.

Inventor:
Walter B. Giles,
by Paul G. Frank
His Attorney.

United States Patent Office 3,455,266
Patented July 15, 1969

3,455,266
AIR FILM DRAG REDUCTION WITH VISCOELASTIC ADDITIVES
Walter B. Giles, Scotia, N.Y., assignor to General Electric Company, a corporation of New York
Filed Feb. 23, 1968, Ser. No. 707,497
Int. Cl. B63b 1/34
U.S. Cl. 114—67      11 Claims

ABSTRACT OF THE DISCLOSURE

The drag on a water vehicle is reduced by forming a film of long chain polymeric material adjacent the vehicle and injecting a gaseous film between the laminar flow thus established and the vehicle. Augmenting surfactants such as a detergent may be introduced along with the polymeric material to assist in stabilizing the gas-liquid interface.

My invention relates to method and apparatus for reducing the drag of bodies or vehicles moving in a liquid medium such as water and more particularly to methods and apparatus for maintaining a gas film adjacent such vehicles to effect such a drag reduction.

The requirements for certain techniques to reduce the drag on vehicles moving in water has long been recognized. One example is U.S. Patent 3,075,489—Eichenberger, which describes methods for air injection and recovery and emphasizes the need for laminar flow and thin gaseous films to reduce drag or friction on a vehicle. One of the difficulties of this proposed technique is the tendency toward wave instability of the gas-liquid interface at slip rates required for useful applications.

In my prior U.S. Patent 3,303,810, Additive Drag Reduction With Recirculation, granted Feb. 14, 1967 and assigned to the assignee of this present invention, I have disclosed methods and apparatus for injecting an additive of a viscous water soluble polymer into the flow steam adjacent the sides of a water vehicle to reduce the frictional effect of drag thereon. Also, an article in Nature magazine of Nov. 4, 1967, "On the Stability of Dilute Viscoelastic Flows" shows that the effect of certain high molecular weight, linear polymers is to stabilize the liquid adjacent a water vehicle.

One object of my present invention is to reduce frictional drag by maintaining a thin gas film adjacent to a vehicle. To achieve this object, high molecular weight, linear polymers are introduced into the liquid prior to gas injection and serve to stabilize the liquid flow and also the gas-liquid interface, in a manner similar to the use of oil spread on ocean waves.

The boundary layers between adjacent strata of a liquid, however, are complex structures. Still more complex is the interface between water and gaseous layers in a system employing the method and apparatus of the aforementioned Patent 3,075,485. Dr. Herman Schlichting in his publication, Boundary Layer Theory, McGraw-Hill Book Company, 1960, and in particular in chapters XVI and XVII, discusses in detail the origin of turbulence in liquids and the effects of pressure gradients, suction, compressibility, heat transfer, and roughness on the transition between layers in a liquid. Thus, this author, as well as many others, has recognized that a boundary layer is a complex structure having a flow component which is stable and upon which may be superimposed certain disturbances. The tendency of these disturbances to grow, under certain conditions, and cause the fluid to become turbulent is known as Tollmien-Schlichting instability.

The tendency of a gas-liquid interface to break up into waves is also a complex phenomenon and is discussed by Sir H. Lamb in his publication "Hydrodynamics," Dover Publications, Inc. A well-known criterion of this condition is given by Helmholtz's stability criterion. Oil spread on the ocean significantly suppresses wave formation and my own recent observation is that the same additives that suppress Tollmein-Schlichting instabilities also suppress wave instabilities.

It is a primary object of my invention to provide methods and apparatus for reducing the drag on a vehicle moving through a body of liquid by suppressing the instabilities in the boundary layers of the liquids surrounding the vehicle.

Still another object of my invention is to provide means and apparatus for suppressing the instabilities in the boundary layer between the liquid and a gas layer in that liquid to permit the use of gas films to reduce the drag on an object moving through the liquid.

In its broadest aspect, my invention consists of providing methods and apparatus to reduce the drag on vehicles in water by forming a film in the water to suppress instabilities and maintain laminar flow in the liquid boundary layer and injecting a gaseous film between the established laminar flow layer and the vehicle, the laminar flow layer being established by injecting a long chained, linear polymer in the water in advance of the gas injection. An additional feature of my invention consists of using other surfactant films to augment the mechanism of the long chained, linear polymer in stabilizing the gas-liquid interface. These augmenting surfactants may, if they are water solvent, such as detergents, for example, be introduced with the polymer solution upstream of gas injection, via a solvent mutually compatible with the water and surfactant, or as a vapor or mist with the gas injection.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings wherein:

Figure 5:
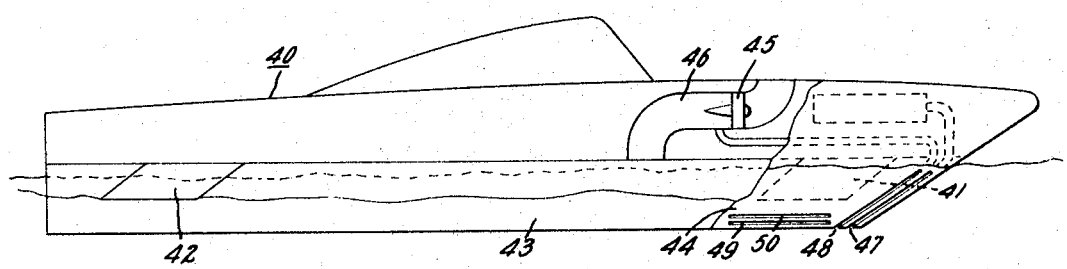
Figure 6:
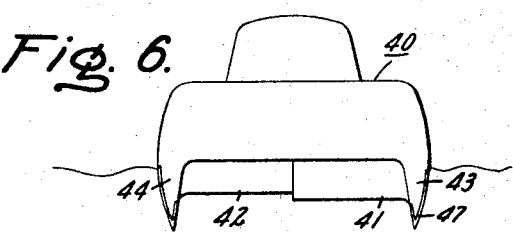
Figure 4:
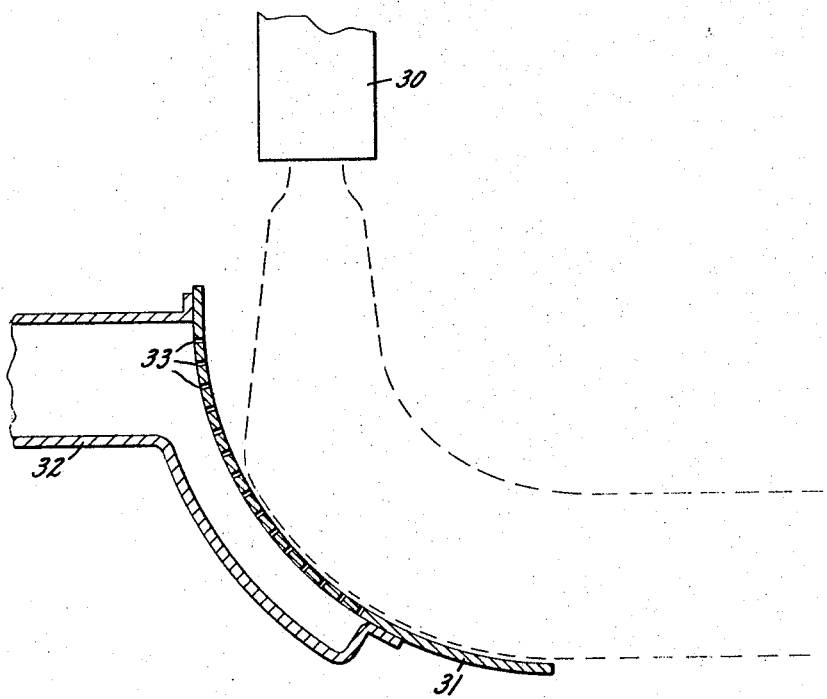

FIGURE 4 schematically illustrates my invention applied to a jet deflector for a rocket test stand;

FIGURE 5 illustrates schematically a captured air bubble boat embodying my invention; and FIGURE 6 is a partial elevation view of the boat of FIGURE 5.

Figure 1:
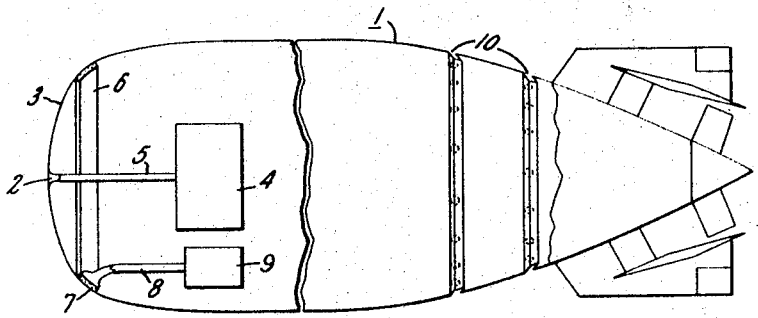
FIGURE 1 is a schematic representation of a plan view of a torpedo embodying my invention.

The underwater vehicle illustrated schematically in FIGURE 1 may comprise a torpedo, submarine, or some similar vehicle 1 having an aperture 2 located near the center of its nose or bow 3. By the term "vehicle" or "water vehicle" is meant any body which is moving relative to a liquid boundary layer and includes a stationary body having a liquid flow relative to it. Positioned within vehicle 1 is an apparatus 4 for mixing a liquid, preferably obtained from the medium surrounding the vehicle, with a high molecular weight, linear polymer. Thus, the apparatus 4 may comprise, for example, that described in my co-pending joint application Ser. No. 642,961, filed June 1, 1967 and assigned to the assignee of the present invention. This application discloses apparatus which extracts ambient liquid, pumps the liquid as a high pressure jet into a mixing chamber, forces a polymeric additive in neutral density liquid suspension into the jet and partially mixes the polymeric additive with the liquid. From the mixing chamber the partially mixed solution passes into a honeycombed chamber where mixing is substantially completed. Examples of appropriate types of additives employed in my invention are polyethylene oxides, polyacrylamides, and guar gum. After mixing, the polymer solution is transmitted through a conduit 5 to aperture 2 near the nose or leading edge of the vehicle and injected into the surrounding liquid. By injecting the liquid near the vehicle nose or leading edge, it is injected into a region of the boundary layer which is highly stable due to favorable pressure gradients and therefore less susceptible to disturbances by the injection. Also, this provides a nearly uniform peripheral distribution of the polymer solution along the outer surface of the vehicle. To facilitate the injection without disturbing the stability of the boundary layer, the injection nozzle 2 may comprise in a well-known manner a porous material, a plurality of slots, or a multiplicity of holes of relatively high hydraulic impedance.

Downstream from the polymer injection opening 2 are located around the hull of vehicle 1 a ring of gas injection openings 6. Positioned across each opening 6 or over the entire ring is a porous member 7, which alternatively may comprise a plurality of slots, and connected with opening 6 through a conduit 8 is a source 9 of a gas under pressure. Preferably, the gas employed is air and source 9 may comprise a conventional compressor. In accordance with my invention, the gas under pressure is introduced to form a film between the hull of vehicle 1 and the layer of polymer solution introduced through injection opening 2. In introducing the gas to form a film, I obtain uniform injection by means of the porous member 7. At the same time, the location of member 7 and the body shape of vehicle 1 establish a pressure gradient which favorably permits the gas to flow along the surface of the hull without mixing with the polymeric layer previously placed on the boundary liquid. Also, it is evident that while I have indicated opening 6 as located only near the nose or bow of the vehicle additional openings may be placed along the sides of the hull for augmenting the gas film at such points along the hull. Also, depending upon the relative length of the vehicle, it may be advisable or even necessary to employ the expedient suggested in the Eichenberger patent to withdraw part of the gas film downstream of the injection points 6, for example, at one or more points 10. Such withdrawal will be particularly desirable if the gas film becomes sensitive to cross-flow or reverse pressure gradients. The withdrawal of the gas film may also be desirable for the purpose of obtaining maximum thrust from any downstream propulsor.

Figure 2:
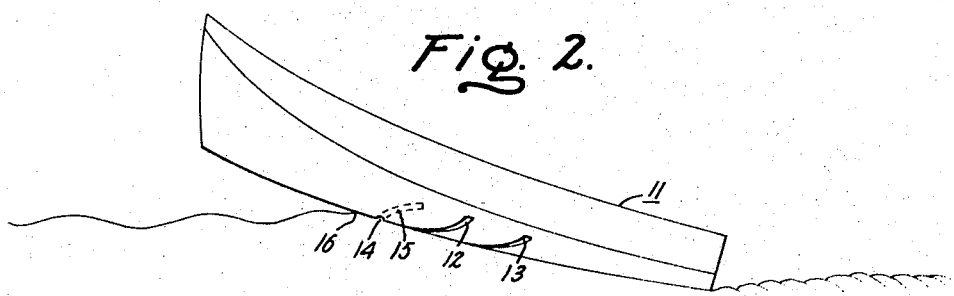
FIGURE 2 illustrates a planing boat utilizing the invention.

In FIGURE 2 I have shown my invention as applied to a planing boat 11. The boat 11 is provided with a plurality of rearwardly inclined slots 12 for injecting a polymer solution in a manner similar to that described in connection with the vehicle of FIGURE 1. Downstream of slots 12 are located gas injection slots 13. I also provide a water intake 14 connected with conduit 15 to mixing apparatus (not shown) similar to apparatus 4 of FIGURE 1. While intake point 14 may be located at other points along the hull of vehicle 11, I prefer to locate it near stagnation point 16 of the planing vehicle.

Figure 3:
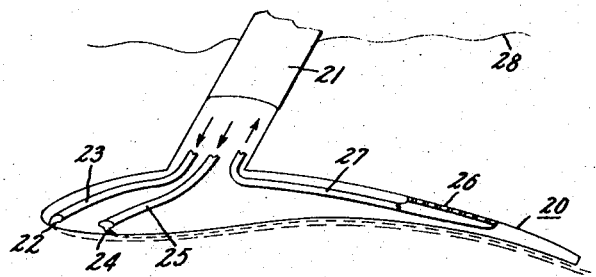
FIGURE 3 illustrates certain features of the invention as applied to a hydrofoil.

FIGURE 3 illustrates my invention as applied to a hydrofoil 20, attached by means of strut 21 to a water vehicle (not shown). Located near the front of hydrofoil 20 is a first injection means 22 for introducing a polymer solution along the outer surface of airfoil 20, injection means 22 being connected by means of conduit 23 to injection solution mixing apparatus (not shown) similar to apparatus 4 of FIGURE 1. Located downstream of injection means 22 is gas injection orifice 24 connected by means of conduit 25 to a gas compressor (not shown). A water intake 26 is located on the upper or suction face of hydrofoil 20 and is connected through conduit 27 to the previously mentioned injection material mixing apparatus where the water is mixed with the long chained, linear polymeric additive material. While intake 26 may be located at other points on the hydrofoil but always below the surface 28 of the water, in the location illustrated, the suction can also serve to aid in preventing separation to allow higher lifts. Since the point illustrated is a low pressure point, a pump may be required.

A quite different application of my invention is illustrated in FIGURE 4 in which the invention is used in connection with a jet deflector plate of the type used for static test firing of rocket engines. In this embodiment, jet engine 30 is supported above a curved deflector plate 31 against which the exhaust gases of the rocket engine 31 impinge. Cooling water for the deflector plate is provided through pipe 32, the cooling water passing through a plurality of openings 33 to flow over the outer surface of plate 31. In accordance with my invention, in this embodiment, the cooling water includes a thoroughly mixed high molecular weight, linear polymer. The presence of the polymer functions to: (1) reduce the friction between the water and the upper surface of the deflector plate to allow higher gas-liquid interface velocities and, therefore, a relatively thinner and more stable liquid film on the upper surface of deflector plate 31; (2) reduce the heat transfer of the liquid film; and (3) reduce the wave instability of the interface. An important advantage of this construction is that considerably less heat is transferred from the rocket or engine exit gases to the deflector plate so that a substantially lower flow of cooling liquid is required.

FIGURE 5 illustrates my invention as applied to a captured-air bubble ship. Such a ship, or water vehicle 40 is provided with a forward planning surface 41, an aft or rear planing surface 42, and a pair of skirts or sideboards 43, 44 which extend into the water. The vehicle also carries a fan or compressor 45 for introducing compressed air through conduit 46 into the pocket formed by the planing surface and the sideboards or skirts. The air-bubble ship essentially is similar to an air-supported ground effect machine except that the sidewalls or skirts extend into the water. The forward and aft planing surfaces tend to ride over the waves, resulting in a trapped pocket of support air provided by fan 45. When the ship is cruising, the propulsive force requirement is essentially that due only to the skin or surface friction of sidewalls 43, 44. The drag on these walls also increases with sea state conditions. In accordance with my invention, both a polymer solution and air are injected in sequence along the leading edges of sidewalls 43, 44 through injection apertures 47, 48. Injection apertures 47 may be slots in both the outer and inner walls of sidewalls 43, 44 to which are supplied a polymeric solution by apparatus similar to that illustrated in FIGURE 1. Likewise, gas injection apertures 48 may also be slots whose general construction is similar to structures 6, 7 illustrated in FIGURE 1. While I have illustrated apertures or slots 46, 47 as being located along the leading edges of sidewalls 43, 44, similar polymer and gas injection apertures (49, 50) may be located along the bottom edge or keel of walls 43, 44. In operation, gas injected through apertures 48 and 50 rises under buoyancy forces and moves longitudinally under shear forces to reduce the drag on the bubble ship. In this construction, as well as in the construction of FIGURES 1-4, while the injection of gas or air alone reduces the frictional drag, even though wave instability and bubbly flow results, by providing a polymer layer to serve as a boundary layer for the gas film, I obtain substantially higher friction reduction and lower gas consumption while facilitating the maintenance of a discrete gas film along the hull of the water vehicle.

In addition to injecting a polymer through opening 2 in the vehicle of FIGURE 1 and the corresponding openings in the vehicles of the other figures, I also augment the mechanism of the long chained linear polymers in stabilizing the gas-liquid interface by injecting with the polymers, as conditions indicate desirable, an augmenting surfactant such as a water solvent detergent, for example, alternatively. Where the augmenting surfactant is in the form of a vapor or mist, I prefer to inject it along with the gas through slots 6.

An important advantage of my invention is that the injection of the polymer into the liquid adjacent a vehicle serves to suppress boundary layer instabilities including Tollmein-Schlichting instabilities as well as modify the properties of the liquid at the interface. Also, it permits employing an additional surfactant to augment the suppression of all wave instabilities at the gas-liquid interface.

While I have shown particular embodiments of my invention, it will, of course, be understood that I do not wish to be limited thereto since many modifications may be made in the structural arrangements shown and in the instrumentalities employed. I contemplate by the appended claims to cover any such modifications as fall within the true spirit and scope of my invention.

What I claim as new and desire to secure by Letters Patent of the United States is:

1. A method of reducing frictional drag on a vehicle caused by movement between the vehicle and an adjacent liquid which comprises:
    injecting a surfactant into a boundary layer of water adjacent the vehicle to establish a film on the water along the side of the vehicle, and
    injecting a gas between the film thus established and the vehicle.

2. A method of reducing frictional drag on a water vehicle which comprises:
    adding a water soluble long chained linear viscoelastic polymer to form a laminar flow stream of additive and water adjacent the outer surface of the vehicle, and
    injecting a gas between the laminar flow stream and the outer surface of the vehicle to form a gas film therebetween for reducing frictional drag on the vehicle.

3. The method of claim 2 in which an additional surfactant is injected with the polymer to augment suppression of wave instabilities of the gas-liquid interface.

4. The method of claim 2 in which the polymer is a material selected from the group consisting of polyethylene oxide, polyacrylamides, guar gum and mixtures thereof, and the gas is air.

5. The method of claim 3 in which the additional surfactant is a detergent.

6. The method of claim 3 in which the additional surfactant is a vapor injected with the gas.

7. Apparatus for reducing frictional drag on a vehicle caused by movement between the vehicle and an adjacent liquid which comprises:
    first means located in said vehicle for injecting a surfactant into the water flow stream to form a laminar flow stream along the outer surface of the vehicle, and
    second means located in said vehicle adjacent said first means along the flow stream for injecting a gas between the laminar flow stream and the outer surface of the vehicle to form a gas film therebetween.

8. The apparatus of claim 7 which includes means injecting with said gas a surfactant to suppress wave instabilities in the laminar flow stream.

9. The apparatus of claim 7 in which said first means comprises means for injecting both a polymer and an additional surfactant.

10. The apparatus of claim 7 which includes:
    means located along the hull of said vehicle downstream from said gas injection means for withdrawing the gas film from the outer surface of the vehicle.

11. The method of claim 2 which includes the step of:
    withdrawing the gas film from the outer surface of the vehicle at a downstream point to facilitate propulsion of the vehicle in the liquid.

References Cited

UNITED STATES PATENTS

| | | | |
|---|---|---|---|
| 3,016,865 | 1/1962 | Eichenberger | 114—67.1 |
| 3,230,919 | 1/1966 | Crawford | 114—67 |
| 3,303,810 | 2/1967 | Giles | 114—67 |
| 3,327,480 | 6/1967 | Gunter | 60—232 |

ANDREW H. FARRELL, Primary Examiner